United States Patent
Bernoni

[19]

[11] Patent Number: 5,518,302
[45] Date of Patent: May 21, 1996

[54] WHEEL ASSEMBLY FOR MOTOR VEHICLES COMPRISING AT LEAST ONE BUSHING FOR POSITIONING THE WHEEL ON AXLES HAVING VARIOUS DIAMETERS

[75] Inventor: Claudio Bernoni, Abano Terme (Padova), Italy

[73] Assignee: Ruote O.Z. S.p.A., Bassano del Grappa (Vicenza), Italy

[21] Appl. No.: 244,869

[22] PCT Filed: Jun. 29, 1993

[86] PCT No.: PCT/IT93/00102

§ 371 Date: Jun. 13, 1994

§ 102(e) Date: Jun. 13, 1994

[87] PCT Pub. No.: WO94/08802

PCT Pub. Date: Apr. 28, 1994

[30] Foreign Application Priority Data

Oct. 14, 1992 [IT] Italy ................. BO920201 U

[51] Int. Cl.⁶ ........................................... B60B 27/06
[52] U.S. Cl. ............................. 301/105.1; 301/111
[58] Field of Search ................. 301/35.63, 105.1, 301/111, 112, 35.62, 119, 120, 121, 122; 403/13; 29/464

[56] References Cited

U.S. PATENT DOCUMENTS

| | | | |
|---|---|---|---|
| 327,658 | 10/1885 | Couch | 301/120 |
| 2,969,256 | 1/1961 | Harberts | 301/9.1 |
| 5,314,241 | 5/1994 | Cheng | 301/121 X |
| 5,318,353 | 7/1994 | Frick | 301/105.1 |

FOREIGN PATENT DOCUMENTS

| | | | |
|---|---|---|---|
| 1200568 | 12/1959 | France. | |
| 1337146 | 9/1963 | France. | |
| 2416126 | 8/1979 | France. | |
| 3233807 | 3/1984 | Germany. | |
| 3822469 | 1/1990 | Germany | 301/105.1 |
| 9201964 | 7/1992 | Germany. | |
| 393555 | 6/1933 | United Kingdom. | |
| 404423 | 1/1934 | United Kingdom | 301/111 |

*Primary Examiner*—Russell D. Stormer
*Attorney, Agent, or Firm*—Darby & Darby

[57] ABSTRACT

An assembly for supporting axles of different diameters in a wheel, in which the wheel has a hub with a bushing receiving portion having an interior surface of a first diameter. The bushing has a portion with an outer surface of a second diameter, somewhat smaller than the hub first diameter, to fit axially into the hub receiving portion and an axle receiving portion having an inner surface of a third diameter that accepts an axle of a corresponding diameter. The hub bushing receiving portion has a first seating on its interior surface and the bushing outer surface has a second seating. A fixing element in the bushing second seating expands radially of the bushing into the hub first seating when the bushing is inserted axially into the hub bushing receiving portion and locks the bushing to the hub.

5 Claims, 1 Drawing Sheet

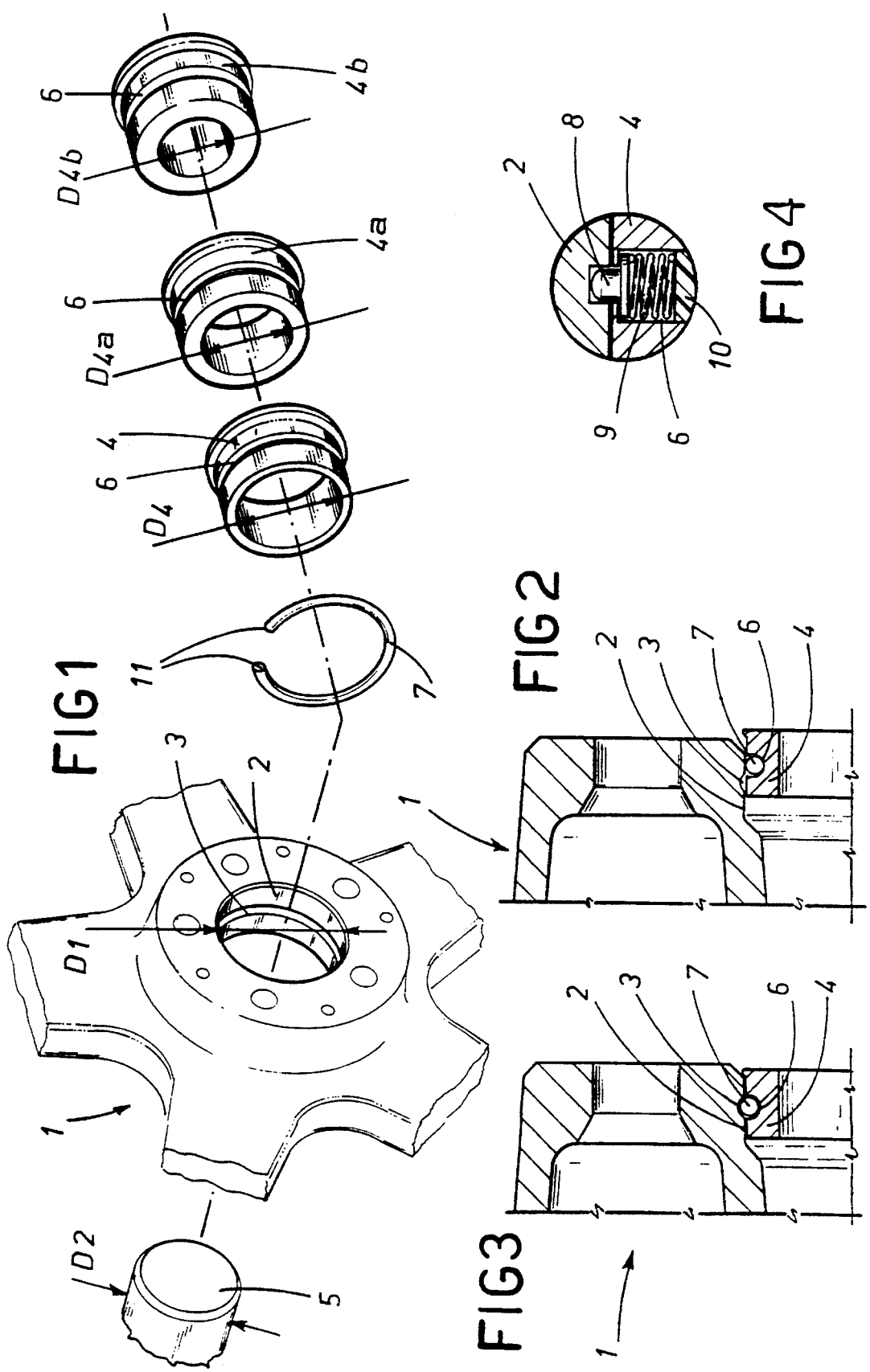

WHEEL ASSEMBLY FOR MOTOR VEHICLES COMPRISING AT LEAST ONE BUSHING FOR POSITIONING THE WHEEL ON AXLES HAVING VARIOUS DIAMETERS

TECHNICAL FIELD

The invention relates to an assembly for centering wheels of motor vehicles on single axles from a determined range of axles, each presenting a different diameter.

Motor vehicle wheels are produced with different hub diameters in accordance with various axles they are destined to equip.

In order not to have too large a range of wheels in production, the wheels are produced in subdivisions of determined measures, relative to the hub diameters, so as to correspond each single wheel size with groups comprising several axles with different diameters, all falling however within a certain size range, equal to the difference between one size wheel and the next.

Each wheel size corresponds to diameters of axles varying from a minimum up to a maximum, which maximum corresponds to the axle by having a diameter which is practically the same as that of the wheel hub.

Leaving aside for a moment axles having the maximum diameter, in order to have a correct positioning of the wheels it is always necessary to eliminate excesses of play which exist between the axle and the wheel hub.

BACKGROUND ART

At present, to adapt the wheels to the axles, closed metal rings or plastic bushings are used, which are cemented to the wheel hubs so as to reduce play between hub and axles and to set the hubs with respect to the axles.

This wheel centering method has some drawbacks with regard to the mounting speed and correct wheel setting.

Substantial time is needed to cement the bushings or rings on the wheel hub, with a consequent increase in labor costs, and even then the setting obtained depends very much on the experience and ability of the operator.

Further, there is an increase in relative play between the parts since not only is there the normal play necessary for the introduction of the axle into the wheel, there is also the play necessary for the introduction of the bushing on the wheel hub, not to mention allowance for the error due to the distribution of the layer of cement used for the fixing.

Another method used for equipping vehicles with wheels having hubs that are of substantially greater diameter than the axle of the vehicle (or in any case where there is a certain play between hub and wheel axle) is that described in U.S. Pat. No. 2,969,256, filed on the 24th Feb. 1958, which envisages an interpositioning between the axle and wheel of a first ring having an external diameter which is about equal to the internal diameter of the hub, and which has an internal diameter which can be keyed onto the axle on which the wheel in being mounted. Any free space between the first above ring and the axle is overcome by the use of one or more second rings, having a circular transversal section with a diameter equal to the distance between the axle and the internal diameter of the ring. The association between the rings is guaranteed by welding them together. This procedure implies long mounting times, rendering the method disadvantageous.

One attempt at solving this problem is proposed by German patent no. 3,233,807, filed on the 11th Sep. 1982. This patent proposes a wheel which can be adapted to a plurality of different vehicles, providing a hub dimensioned according to the maximum diameter of the axles to be equipped, and a ring which is interplaced between the hub and the wheel axle to occupy the space due to the difference in diameter between the hub and axles with a smaller diameter than the largest of the group.

A drawback in this approach is the small contact surface that exists between the elements: indeed, the elastic ring adheres to small portions of the hub axial development and the axle. Since, therefore, only a part of the breadth of the hub and axle actually interact, which part corresponds more or less to the limited breadth of the ring, the solution proposed by the open ring of the above invention can give rise to instability.

BRIEF DESCRIPTION OF THE INVENTION

The aim of the present invention is to eliminate the above-mentioned drawbacks by providing a wheel with a hub having a diameter which is associated to the maximum-diameter axle in a series or group of axles, and also by providing a series of bushings having internal diameters equal to the diameters of a acorresponding series of axles to which the said wheel can be keyed, and all having an external diameter which is slightly smaller than the wheel hub diameter. On its external surface each of the bushings has at least one seating to receive elastically deformable means which fully enter into the seating during the introduction phase of a bushing internally to the wheel hub, and then expand into a seating present on the internal surface of the said hub when the bushing has been completely introduced internally to the hub.

Advantageously with respect to the prior art, a mechanical connection is obtained between the wheel and the bushing introduced internally to the hub by means acting radially which oppose the accidental exiting of the bushing, thus permitting of setting the external diameter of each different bushing in such a way as to have a play-free coupling between wheel and bushing used to key a determined axle on the wheel.

A further advantage is that the bushings can have a considerable axial development, up until they almost entirely cover the axle over all of the hub's axial development, so that mounting is made considerably easier and a better axial coupling stability is obtained between hub and bushing and thus the wheel is mounted better on the axle it is keyed on.

In a preferred embodiment, the said mechanical fixing means for one of the bushings introduced internally of the hub are constituted by an open ring having two ends which can be pushed towards each other rendering the whole elastically deformable, exhibiting in rest conformation an external diameter which is greater than that of the wheel hub and, when applied, an internal diameter which is slightly greater than the external diameter of the bushing.

BRIEF DESCRIPTION OF THE DRAWINGS

More details of the present invention will better emerge from the detailed description that follows, of an embodiment of the invention, herein illustrated purely in the form of a non-limiting example in the accompanying figures, in which:

FIG. 1 shows, in an exploded perspective view with some parts removed, of an embodiment of the invention;

FIG. 2 shows, in a section view, a detail of the fixing means of a bushing and a hub, during the insertion of the bushing in the hub;

FIG. 3 shows, in a section view, the detail of FIG. 2 with the bushing inserted in the hub; and FIG. 4 shows, in a section view, a detail relative to a further possible embodiment of the fixing means of the bushing on the hub.

DETAILED DESCRIPTION OF THE INVENTION

With reference to the figures, the assembly for positioning wheels or the like on axles exhibiting differing diameters throughout a given range comprises a wheel 1 having a hub 2 of diameter D1 associable to an axle of the maximum diameter in the above-mentioned range of diameters and also exhibiting on the surface on the said hub 2 at least one seating 3 aimed at partially receiving mechanical fixing means of a bushing 4 introduced internally to the said hub 2.

In the embodiment illustrated in the drawings, the hub 2 has a diameter D1 which is greater that the diameter D2 of the axle 5 on which the wheel 1 is mounted.

The positioning assembly comprises a bushing 4 of internal diameter D4 which is almost the same as the diameter of the axle 5 on which it is to be keyed and having a slightly smaller external diameter with respect to diameter D1 of the hub 2 of the wheel 1. On its external surface the bushing 4 has a seating 6 for receiving mechanical means for fixing the bushing 4 on the wheel 1.

In order to fit the wheel 1 on axles having different diameters a plurality of bushings is provided, which in FIG. 1 are represented by way of example the parts denoted 4, 4a and 4b (although the real number will depend on the number of different axles the wheel is to be mounted on), having a maximum external diameter which is slightly smaller than the diameter D1 of the wheel 1 and exhibiting different internal diameters D4, D4a and D4b (which in FIG. 1 are differentiated more than they would be in reality so as to better show the differences between them), which are slightly greater than the diameters of the axles they will be keyed on. To simplify the invention in use differently colored bushings 4 can be used, according to the different diameters of the axles of the vehicles the wheels are to be mounted on.

The fixing means between bushing 4 and hub 2 in the embodiment illustrated in FIGS. 1, 2 and 3, are constituted by an open ring 7 elastically deformable by closing the two ends 11, exhibiting in its rest (undeformed) position an external diameter which is greater than that of the hub 2 of the wheel 1, and, when in place, an internal diameter which is slightly greater than than of the external diameter of the bushing 4.

In order to obtain a correct positioning of the wheel 1 on the axle 5, the open ring 7 is inserted in the seating 6 which is circular in an embodiment using an open ring as fixing means, provided on the bushing 4 with an elastic deformation which, when bringing the ends towards each other, temporarily reduces the circumference of the open ring 7. Once the bushing 4 has been introduced internally to the hub 2, the ring, being no longer restrained, expands partially outside the seating 6 of the bushing 4 and, without completely exiting, inserts in the seating 3 provided on the internal surface of the hub 2, stopping any axial sliding of the wheel 1.

In the figures, the open ring 7 exhibits a circular transversal section, but can be differently conformed. Obviously the seating on the bushing 4 and the hub 2 would change to match the shape of the ring 7.

The fixing means could consist of at least one element, for example a pushpin 8 inserted into the base of an elastic element 9, such as a spring, (see FIG. 4) inserted in the seating 6 provided on the bushing 4 and positionable in at least two configurations: one of the positions is assumed during the phase of insertion of the bushing 4 into the hub 2, and provides the total insertion of the element internally to the said frame 6, while the other provides the partial exit of the bushing 4 for a portion shaped like the seating 3 provided on the internal surface of the hub 2 and stably insertable in it when the bushing 4 is completely inserted in the hub 2. Obviously in this case the seating 6 is conformed so as to contain the pin 8 and the elastic element 9, which might be a spring, and can be made by means of a through hole, narrow on the side facing the hub 2 so as to cause only a portion of the pivot to project and closed internally, on the side facing the axle, by a stopper 10 which might be pressure-inserted.

These elements could number more than one and preferably arranged on the bushing 4 are destined to insert hub 2 into the seating 3 which hub 2 can exhibit the same conformation as the case illustrated in FIGS. 1, 2 and 3 in which the fixing means are of the ring type.

I claim:

1. A wheel assembly comprising:

a wheel having a hub with a receiving portion, said receiving portion having an interior cylindrical surface of a first diameter and inner and outer end faces and a first circular recessed seating groove on said interior surface between said inner and outer faces and entirely internal of said hub receiving portion and recessed relative to said interior surface;

a bushing having a cylindrical outer surface of a second diameter smaller than said first diameter of said hub receiving portion interior surface to fit within said hub receiving portion and an inner portion of a third diameter selected from a predetermined range of axle outer diameters for receiving an axle of a corresponding diameter within said range of axle outer diameters, said bushing having inner and outer end faces and a second recessed circular seating groove on the outer surface of said bushing between said inner and outer end faces; and an elastically expandable fixing ring seating in said bushing second seating groove, said fixing ring expanding radially of said bushing into said hub first seating groove upon the bushing outer surface being axially inserted into said hub receiving portion to lock said bushing against axial displacement from said hub.

2. A wheel assembly as in claim 1 wherein said fixing ring comprises an open ring, elastically deformable at an open portion between its ends, said ring in a rest position having an external diameter greater than the first diameter of the hub interior surface and in an applied position when seated in second seating groove has an outer diameter larger than the bushing outer surface second diameter and larger than the hub interior surface first diameter.

3. A wheel assembly as in claim 2, wherein said fixing ring is radially slidable internally of said bushing second seating groove between one position, assumed during an insertion phase of the bushing into the hub, wherein the said fixing ring is totally retracted in said second seating groove and a position wherein said fixing ring is forced by elastic reaction to have a portion project from the bushing outer surface and lock in said hub first seating groove and be insertable in said first seating groove when the bushing is completely inserted in the hub.

4. A wheel assembly as in claim 1, wherein said bushing has a color to identify the diameter of an axle to be used with said bushing.

5. A wheel assembly as in claim 1 wherein the opposing surfaces of the hub and bushing are complementary and the seating of each is interior of said end faces of the hub receiving portion.

* * * * *

UNITED STATES PATENT AND TRADEMARK OFFICE
CERTIFICATE OF CORRECTION

PATENT NO. : 5,518,302
DATED : May 21, 1996
INVENTOR(S) : Claudio BERNONI

It is certified that error appears in the above-indentified patent and that said Letters Patent is hereby corrected as shown below:

On the title page: Item

[22], PCT Filed, change "Jun. 29, 1993" to --Sept. 29, 1993--;

Item [30], Foreign Application Priority Data, change "BO920201 U" to --BO92U 000201--.

Signed and Sealed this

Fifteenth Day of October, 1996

*Attest:*

BRUCE LEHMAN

*Attesting Officer*     *Commissioner of Patents and Trademarks*